(12) United States Patent
Zhu et al.

(10) Patent No.: US 11,733,104 B1
(45) Date of Patent: Aug. 22, 2023

(54) HIGH STABILITY BLUETOOTH TEMPERATURE MEASURING PROBE

(71) Applicant: SHENZHEN KUKI ELECTRONIC CO., LTD., Guangdong (CN)

(72) Inventors: Rongyuan Zhu, Shenzhen (CN); Guo Qu, Shenzhen (CN); Hengshou Qiu, Shenzhen (CN); Jianhua Yu, Shenzhen (CN)

(73) Assignee: SHENZHEN KUKI ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 18/097,529

(22) Filed: Jan. 17, 2023

Related U.S. Application Data (63) Continuation of application No. PCT/CN2022/021403, filed on Sep. 26, 2022.

(30) Foreign Application Priority Data

Jun. 15, 2022 (CN) .......................... 202210675166.8
Jul. 18, 2022 (CN) .......................... 202221852991.2

(51) Int. Cl.
*G01K 1/14* (2021.01)
*G01K 1/024* (2021.01)

(52) U.S. Cl.
CPC .............. *G01K 1/14* (2013.01); *G01K 1/024* (2013.01); *G01K 2215/00* (2013.01)

(58) Field of Classification Search
CPC ....... G01K 1/14; G01K 1/024; G01K 2215/00
USPC ......................................................... 374/208
See application file for complete search history.

(56) References Cited

U.S. PATENT DOCUMENTS

| 10,024,736 B2 | 7/2018 | Nivala et al. |
| 2014/0202244 A1 | 7/2014 | Giterman |
| 2022/0333997 A1* | 10/2022 | Newhouse ............. G01K 1/024 |

FOREIGN PATENT DOCUMENTS

| CN | 103712706 A | 4/2014 |
| CN | 112525366 A | 3/2021 |
| CN | 212721839 U | * 3/2021 |
| CN | 213780780 U | 7/2021 |
| CN | 213902686 U | 8/2021 |
| CN | 215524878 U | 1/2022 |

(Continued)

OTHER PUBLICATIONS

International Search Report Corresponding to Related Application No. PCT/CN2022/121403, dated Dec. 29, 2022; 5 pgs.

*Primary Examiner* — Lisa M Caputo
*Assistant Examiner* — Janice M Soto
(74) *Attorney, Agent, or Firm* — Cooper Legal Group, LLC (57) ABSTRACT

The present application relates to the technical field of thermodetector, and discloses a high stability Bluetooth temperature measuring probe, including a needle tube having a hollow mounting chamber, a handle configured to abut against a tail end of the needle tube, a first thermal sensor positioned in the mounting chamber of the needle tube close to the head end, an antenna mounted inside the needle tube and electrically connected to the first thermal sensor, and a locking assembly configured for connecting the handle to the needle tube. The locking assembly includes a locking member, a locking nut and a limiting nut, in which the limiting nut is connected to the antenna and is configured to limit the locking member; and an inner wall of the needle tube is defined with a locking slot.

13 Claims, 7 Drawing Sheets

(56) References Cited

FOREIGN PATENT DOCUMENTS

| CN | 114878011 A | 8/2022 | | |
|----|----|----|----|----|
| CN | 217442708 U | 9/2022 | | |
| WO | WO-2017050307 A1 | * | 3/2017 | ............... F24C 7/08 |
| WO | WO-2022101846 A1 | * | 5/2022 | ............. G01K 1/024 |

* cited by examiner

HIGH STABILITY BLUETOOTH TEMPERATURE MEASURING PROBE

CROSS-REFERENCE TO RELATED APPLICATIONS

This application is a continuation of PCT application serial no. PCT/CN2022/121403, filed on Sep. 26, 2022, which claims the priority and benefit of China patent application serial no. 202210675166.8, filed on Jun. 15, 2022 and China patent application serial no. 202221852991.2, filed on Jul. 18, 2022. The entirety of PCT application serial no. PCT/CN2022/121403, China patent application serial no. 202210675166.8, 2022 and China patent application serial no. 202221852991.2 are hereby incorporated by reference herein and made a part of this specification.

TECHNICAL FIELD

The present application relates to the technical field of temperature measuring device, and particularly to a high stability Bluetooth temperature measuring probe.

BACKGROUND ART

During food processing and cooking, for example, when grilling and heating materials, especially some thicker materials, it is difficult for a person to know whether the whole of the materials are completely baked through observation.

Currently, a temperature measuring probe is usually pierced into the materials to measure the temperature inside the materials, so as to conveniently determine whether the materials are thoroughly baked. US patent publication no. US10024736B2 published on Jul. 17, 2018 discloses a high stability Bluetooth temperature measuring probe, in particular a thermometer for measuring temperature of heated foods. The thermometer includes a first portion configured to be positioned in the food, a second portion connected to the first portion, and a third portion connected to the second portion. The thermometer further includes an outer shell that extends from the second portion to the third portion, in which the outer shell includes a metallic portion and a non-metallic portion, and a thermal sensor is located in the metallic portion to measure a temperature inside the food. The thermometer further includes an inner shell inside the outer shell, which extends from the metallic portion into the non-metallic portion such that the inner shell in the non-metallic portion serves as at least a part of an antenna. The presence of the non-metallic portion can prevent the antenna from being completely shielded and, in turn, failing to transmit a signal to the outside.

In existing technical solutions, generally, a non-metallic portion is connected to a metal portion of an outer shell by close fitting and insertion. However, in actual working conditions, such close fitting members are difficult to be precisely produced and controlled in terms of fit tolerance, leading to poor fit stability and easy disengagement of the metallic portion from the non-metallic portion during a long-term use.

SUMMARY

In order to solve the problem of poor connection stability between a metallic portion and a non-metallic portion of a temperature measuring probe shell in existing technologies, the present application provides a high stability Bluetooth temperature measuring probe, adopting the following technology solution:

a high stability Bluetooth temperature measuring probe, including a needle tube, a hollow mounting chamber, in which the needle tube has a head end and a tail end along a length direction thereof;

a handle configured to abut against the tail end of the needle tube;

a first thermal sensor configured for measuring temperature, in which the first thermal sensor is positioned in the mounting chamber of the needle tube close to the head end;

an antenna configured for transmitting signals, in which the antenna is mounted inside the needle tube and electrically connected to the first thermal sensor;

a locking assembly configured for connecting the handle to the needle tube, and locking the handle and the needle tube with each other;

the locking assembly includes a locking member, a locking nut and two limiting nuts, in which the two limiting nuts is connected to the antenna; the locking member is limited between the two limiting nuts; an inner wall of the needle tube is defined with a locking slot configured for snap-in of the locking member; the locking nut is connected to the antenna; and the locking nut cooperates with the two limiting nuts, such that the handle abuts against the tail end of the needle tube.

In the above technical solution, the handle is abutting limited by and mounted on the needle tube by the locking assembly, so that a high stability mounting of the handle can be achieved. In conventional technical solutions, because the temperature signals need to be transmitted by a Bluetooth module to external mobile smart terminals through the antenna to conveniently measure the temperature, the handle of the temperature measuring probe is made of ceramic material with high temperature resistance and poor shielding efficiency. However, it is difficult for a brittle ceramic handle to be machined with a fine thread to cooperate with needle tube, and the brittle ceramic handle is liable to break. Therefore, a way of close fitting and insertion between the handle and the needle tube is adopted usually. However, because the handle is of ceramic material, it is difficult to precisely produce the handle, and it is easy for the handle to suffer from a large fit tolerance, resulting in poor fit stability and easy disengagement of the handle from the needle tube during a long-term use. In the technical solution of the present application, by means of clamping the locking member via the limiting nuts, the locking member is indirectly connected to the antenna, and the locking nut is inserted into the handle and is in thread connection with the antenna. When the limiting nut is snapped into the locking slot, the antenna is tightened, so that the handle abuts against the tail end of the needle tube by the locking nut, and further the handle can be mounted to the needle tube with a high stability, and is not likely to be detached.

Alternatively, the high stability Bluetooth temperature measuring probe also includes a PCB control board positioned in the mounting chamber and a second thermal sensor configured for measuring an environment temperature; in which the head end of the needle tube is configured to be placed inside an object to be measured and conducted heat; the first thermal sensor is configured to measure a temperature of the head end of the needle tube; the first thermal sensor and the second thermal sensor are both electrically connected to the PCB control board; a pin is connected between the second thermal sensor and the PCB control board; the antenna has an accommodating space for accommodating the second thermal sensor and the pin; and the accommodating space is configured for allowing the locking assembly to pass through.

By adopting the above technical solution, a temperature of a material to be measured is measured by the first thermal sensor; an environment temperature is measured by the second thermal sensor; and the first thermal sensor and the second thermal sensor are both electrically connected to the PCB control board, so as to transmit a temperature signal through the antenna. The handle is locked with the needle tube by the locking assembly to ensure the connection stability; and the second thermal sensor and pin are accommodated in the accommodating space. In the existing technical solution, because the non-metallic handle is generally made of brittle ceramic material, it is difficult to machine fine thread to cooperate with the thread of the needle tube. Therefore, a way of close fitting and insertion between the handle and the needle tube is adopted usually, however, such close fitting member is difficult to be precisely produced to control the fit tolerance, resulting in poor fit stability. So the handle is easily to be detached from the needle tube during a long using process. In the technical solution of the present application, the handle is locked with the needle tube by the locking assembly, a connection stability between the handle and the needle tube can be ensured, and the problem of easy detaching between the handle and the needle tube can be effectively solved.

Alternatively, the accommodating space includes an accommodating slot for accommodating the second thermal sensor and a through slot configured for allowing the pin to pass through; the antenna is formed with a first external thread at a middle part thereof; the through slot is configured to run through the first external thread; the accommodating slot is recessed in the antenna; and the pin is configured to pass through the through slot;

or, the accommodating space includes the accommodating slot for accommodating the second thermal sensor and the through slot configured for allowing the pin to pass through; the antenna is formed with the first external thread at a middle part thereof; there are two pins and two through slots; two through slots are formed on the surface of the first external thread at intervals; and two pins are positioned on the surface of the antenna and configured to run through the two through slots, respectively;

or, the accommodating space includes a mounting slot recessed in a circumferential sidewall of the antenna; the mounting slot is configured for accommodating the second thermal sensor and the pin; the mounting slot configured to run from one end of the antenna close to the PCB control board to one end of the antenna away from the PCB control board; the antenna is formed with the first external thread at a middle part thereof, and the mounting slot is configured to run through the first external thread;

or, the antenna is configured to be a hollow columnar structure; and the accommodating space is formed inside the antenna along a length direction thereof.

By adopting the above technical solution, on the one hand, the second thermal sensor is provided at one end of the antenna away from the head end of the needle tube to further ensure accuracy of the measured environment temperature, because the head end of the needle tube is configured to be inserted into a material to be measured to measure the temperature. On the other hand, the first external thread is penetrated by the through slot to facilitate the pin to pass, which not only can ensure the locking effect, but also effectively connect the second thermal sensor to the PCB control board.

In another embodiment, the second thermal sensor is positioned in the accommodating slot, and the pin passes through the through slot, thereby improving the mounting stability between the second thermal sensor and the pin. Moreover, the two through slots are positioned at opposite sides of the first external thread in a circumferential direction, the two pins pass through the two through slots, respectively, so that the two pins are away from each other, which can effectively prevent the two pins from contacting with each other.

In an embodiment, the antenna is recessed with a mounting slot for accommodating the second thermal sensor and the pins at the same time. The mounting slot is configured to run through the first external thread, and the pin is mounted into the mounting slot and pass through the first external thread, meanwhile, the limiting nut still can be in thread connection with the first external thread to achieve the locking function. In addition, the second thermal sensor and the pin are both mounted into the mounting slot, which has a better limiting function to the second thermal sensor and the pin, and can further ensure the mounting stability.

In another embodiment, the accommodating space is formed inside the antenna to accommodate the second thermal sensor and the pin, so as to effectively keep off the locking assembly outside the antenna, and effectively prevent the pin and the locking assembly from interfering with each other.

Alternatively, the locking slot is formed around an axis of the needle tube; the locking member is configured to be a C-shaped structure, and configured to be compressed by the inner wall of the needle tube and deformed elastically when the locking member is sliding into the mounting chamber along a length direction of the needle tube.

By adopting the above technical solution, the locking slot is formed around an axis of the needle tube, so the locking member can be conveniently inserted into the locking slot. In some other embodiments, the locking slot is not an annular structure, so the locking member may rotate relative to the antenna when the locking member moves with the antenna, such that the locking member is difficult to be accurately snapped into the locking slot, resulting in a failed locking. In an embodiment of the present application, the locking slot is formed around an axis of the needle tube to improve the convenience for clamping of the locking member and the fault tolerant ability of the clamping fitting between the locking member and the locking slot.

Alternatively, the locking member has a first sliding portion close to the head end of the needle tube, a second sliding portion close to the tail end of the needle tube and a guiding portion for connecting the first sliding portion to the second sliding portion; the guiding portion has a cross-sectional area gradually decreased from one end thereof close to the second sliding portion to one end thereof close to the first sliding portion; the first sliding portion has an external diameter less than an internal diameter of the mounting chamber; and the second sliding portion has an external diameter greater than an external diameter of the mounting chamber.

By adopting the above technical solution, the provided guiding portion plays a role of guiding the locking member during inserting the antenna into the mounting chamber, thereby gradually compressing the locking member. As the first sliding portion has an external diameter less than the internal diameter of the mounting chamber, when the antenna is inserted into the head end of the needle tube, one end of the guiding portion close to the head end of the needle tube is able to be inserted into the mounting chamber, then the guiding portion is slid relative to the inner wall of the mounting chamber, so that the locking member is gradually compressed and deformed to facilitate inserting the locking member into the needle tube, which improves the convenience for compressing and inserting the locking member into the needle tube.

Alternatively, the handle includes a holding part and an inserting part configured to be inserted into the mounting chamber; the holding part has an abutting surface connected to the inserting part and configured to abut against the tail end of the needle tube when the inserting part is inserted into the mounting chamber.

By adopting the above technical solution, the external diameter of the holding part is same as that of the needle tube, so that the connection portion between the handle and the needle tube is smooth. By means of the inserting part, the handle is able to be preliminarily inserted into the needle tube, and the external diameter of the holding part is aligned with that of the needle tube, so that the abutting surface can be aligned with the tail end of the needle tube with a smooth connection portion, improving the smoothness of the overall appearance.

Alternatively, an outer wall of the limiting abuts against an inner wall of the mounting chamber; an injection chamber is formed between the limiting nut close to the tail end and the tail end; and the inserting part is configured to be inserted into the injection chamber.

By adopting the above technical solution, the outer wall of the limiting nut abuts against the inner wall of the mounting chamber, which can prevent the glue from permeating into the head end of the needle tube. In actual production conditions, the antenna with the limiting nut and the locking member is inserted into the mounting chamber to make the locking member be snapped into the locking slot. Then, the glue needs to be injected into the mounting chamber from the tail end of the needle tube. The handle is inserted into the mounting chamber, and the locking nut is inserted into the handle to be tightened to the antenna, so that the handle is abutted against the needle tube. By making the outer wall of the limiting nut abut against the inner wall of the mounting chamber, on the one hand, the glue may be prevented from permeating into the head end of the needle tube to affect other components, on the other hand, the glue can backflow to the tail end of the needle tube after the handle is inserted into the mounting chamber, so as to fill the gap between the handle and the inner wall of the needle tube, further improving the connecting stability between the handle and the needle tube, and the sealing performance.

Alternatively, the high stability Bluetooth temperature measuring probe further includes an elastic tab and a PCB control board, in which the PCB control board is configured for electrically connecting the antenna to the first thermal sensor; there are two elastic tabs provided at an upper side and a lower side of the PCB control board, respectively; and the two elastic tabs are configured to abut against the inner wall of the needle tube when being compressed.

By adopting the above technical solution, two elastic tabs are provided on two surfaces of the PCB control board, therefore the PCB control board is supported at central part of the hollow cavity by the two elastic tabs. Therefore, the two elastic tabs play a supporting role to the PCB control board, and can effectively reduce the contact between the PCB control board and the needle tube, and reduce the possibility of PCB control board being seriously damaged due to severe heating through heat conduction of the needle tube during measuring temperature, meanwhile play a protecting role to the PCB control board.

Alternatively, the PCB control board is electrically connected to a power supply module; a positive electrode of the power supply module is electrically connected to the antenna; the PCB control board is electrically connected to the elastic tab; a negative electrode of the power supply module is electrically connected to the needle tube through the PCB control board and the elastic tab in turn; the locking nut is configured to electrically connect the positive electrode of the power supply module to an external power supply; and the needle tube is configured to electrically connect the negative electrode of the power supply module to the external power supply.

By adopting the above technical solution, by providing a power supply module with charging and discharging function, the negative electrode of the power supply module is electrically connected to that of the external power supply by the needle tube, and the positive electrode of the power supply module is electrically connected to that of the external power supply by the locking nut, so that it can adapt to a special charging box without an additional charging structure and connecting wire. Taking advantage of the metal conductivities of the antenna and the needle tube, the temperature measuring probe can be charged conveniently and quickly.

Alternatively, a supporting nut is in thread connection with one end of the antenna close to the PCB control board; a periphery of the supporting nut abut against an inner wall of the needle tube; and the limiting nut and the supporting nut are both made of a ceramic material.

By adopting the above technical solution, by providing a supporting nut, one end of the antenna close to the PCB control board is supported, so that the supporting nut has a supporting effect to the antenna, ensures the mounting stability of the antenna, and effectively prevent the antenna from touching the needle tube to cause a short circuit during charging.

In summary, the present application achieves at least the following beneficial technical effects:

1. the handle is abutted against, limited and mounted on the needle tube by the locking assembly, so that a high stability mounting of the handle can be achieved. In the existing technical solution, because the temperature signals need to be transmitted by a Bluetooth module to external mobile smart terminals through the antenna to conveniently measure the temperature, 10 the handle of the temperature measuring probe is made of ceramic material with high temperature resistance and poor shielding efficiency. However, it is difficult for brittle ceramic handle to be machined into a fine thread to cooperate with needle tube, and the brittle ceramic handle is liable to break. Therefore, a way of close fitting and insertion between the handle and the needle tube is adopted usually. However, because the handle is ceramic material, it is difficult to precisely control the production, and it is easy to generate a large fit tolerance, resulting in poor fit stability, then the handle tends to be detached from the needle tube during a long using process. In the technical solution of the present application, the locking member is indirectly connected to the antenna by clamping the limiting nut with locking member, the locking nut is inserted into the handle and is thread connection with the antenna. When the limiting nut is snapped into the locking slot, the antenna is tightened, so that the handle is abutted against the tail end of the needle tube by the locking nut, and further the handle can be mounted to the needle tube with a high stability, and is not likely to be detached;

2. on the one hand, the second thermal sensor is provided at one end of the antenna away from the head end of the needle tube to further ensure accuracy of the measured environment temperature, because the head end of the needle tube is configured to be inserted into a material to be measured to measure the temperature. On the other hand, the first external thread is penetrated by the through slot to facilitate the pin to pass, which not only can ensure the locking effect, but also effectively connect the second thermal sensor to the PCB control board;

3. the outer wall of the limiting nut abuts against the inner wall of the mounting chamber, which can prevent the glue from permeating into the head end of the needle tube. In actual production conditions, the antenna with the limiting nut and the locking member is inserted into the mounting chamber to make the locking member be snapped into the locking slot. Then, the glue needs to be injected into the mounting chamber from the tail end of the needle tube. The handle is inserted into the mounting chamber, and the locking nut is inserted into the handle to be tightened to the antenna, so that the handle is abutted against the needle tube. By making the outer wall of the limiting nut abut against the inner wall of the mounting chamber, on the one hand, the glue may be prevented from permeating into the head end of the needle tube to affect other components, on the other hand, the glue can backflow to the tail end of the needle tube after the handle is inserted into the mounting chamber, so as to fill the gap between the handle and the inner wall of the needle tube, further improving the connecting stability between the handle and the needle tube, and the sealing performance.

DETAILED DESCRIPTION

The present application is further described in detail below in combination with the drawings.

The embodiments of the present application disclose a high stability Bluetooth temperature measuring probe.

Figure 1:
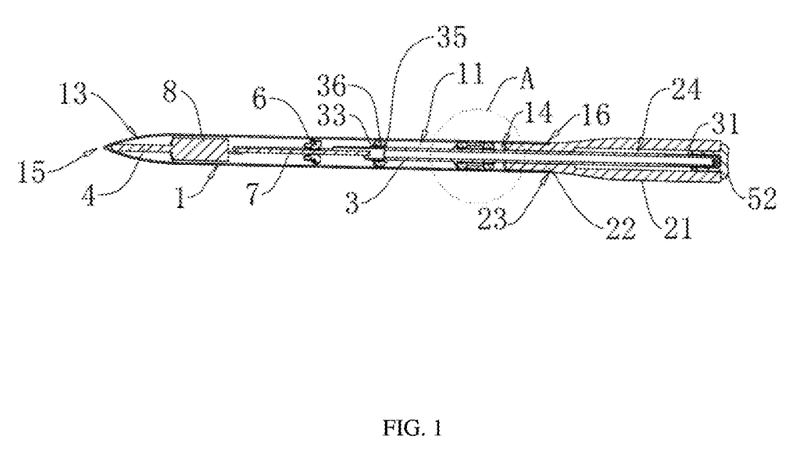
FIG. 1. is a section view of the overall structure with a second thermal sensor hidden according to an embodiment of the present application.
Figure 2:
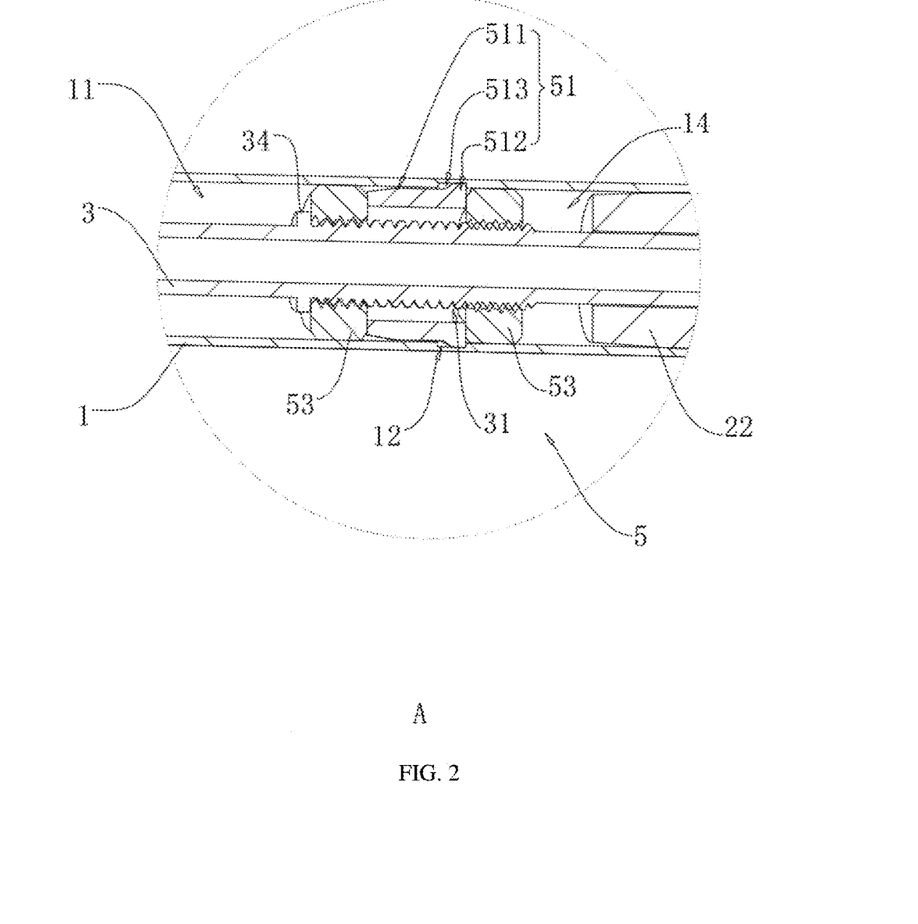
FIG. 2 is an enlarged diagram of A for illustrating a clamping structure between a locking member and a locking slot according to an embodiment of the present application.

Referring to FIGS. 1-2, the high stability Bluetooth temperature measuring probe includes a needle tube 1, a handle 2, a first thermal sensor 4, an antenna 3 and a locking assembly 5. The needle tube 1 has a head end 15 and a tail end 16 opposite arranged along the length direction thereof. A mounting chamber 11 is formed inside the needle tube 1. The first thermal sensor 4 is mounted inside the mounting chamber 11 close to the head end 15 of the needle tube 1, and the handle 2 is inserted into the mounting chamber 11 close to the tail end 16 of the needle tube 1 and abutted against the tail end of the needle tube 1. The antenna 3 is mounted inside a vacuum chamber and electrically connected to the first thermal sensor 4. The locking assembly 5 is connected to the handle 2 and the needle tube 1 to stably lock and mount the handle 2 on the needle tube 1 stably. The locking assembly 5 includes a locking member 51 having elasticity, a locking nut 52 and two limiting nuts 53, in which the two limiting nuts 53 is in thread connection with a central part of the antenna 3 to limit the locking member 51. The inner wall of the needle tube 1 is defined with a locking slot 12 corresponding to the locking member 51, and the locking nut 52 is in thread connection with the antenna 3 and abutted against one end of the handle 2 away from the needle tube 1. When the locking member 51 is snapped into the locking slot 12, the handle 2 is abutted against and limited at the tail end 16 of the needle tube 1 by the cooperation of the locking nut 52 and antenna 3, so that the handle 2 can be clamped between the locking nut 52 and the needle tube 1.

Referring to FIGS. 1-2, the needle tube 1 is a generally hollow cylindrical structure, and an opening of the mounting chamber 11 is positioned at the tail end 16 of the needle tube 1. The head end 15 of the needle tube 1 has a spike part 13 gradually narrowed along a direction away from the tail end 16 of the needle tube 1 to facilitate piercing into the materials to be measured.

Figure 3:
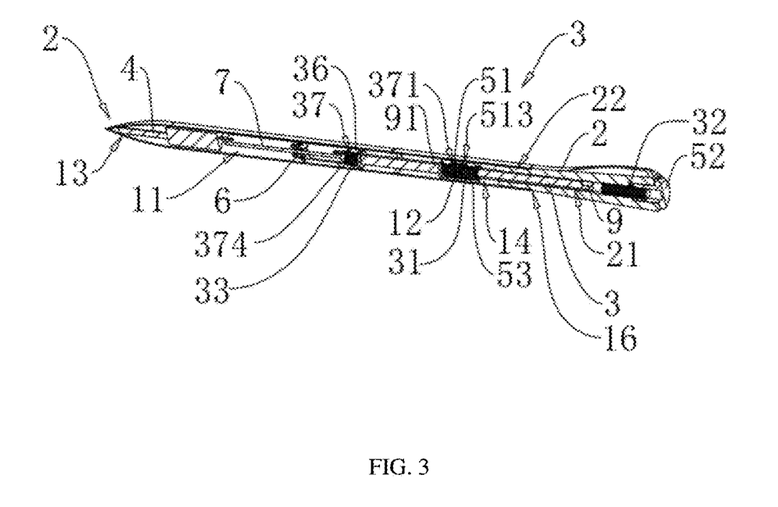
FIG. 3 is a section view of the overall structure according to embodiment 1 of the present application.
Figure 4:
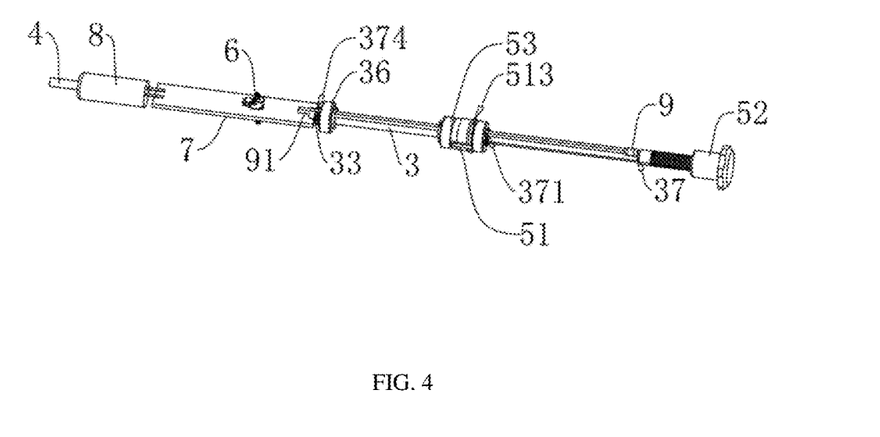
FIG. 4 is an overall structure schematic diagram with the handle and the needle tube hidden according to embodiment 1 of the present application.

Referring FIGS. 3-4, the handle 2 includes a holding part 21 and inserting part 22 for being inserted into the mounting chamber 11, and the handle 2 is formed with a wire-passing channel 24 configured to run through the handle 2 along the length of the needle tube 1. The inserting part 22 is generally cylindrical structure, and has a cross-sectional diameter adapted to that of the mounting chamber 11, so that the inserting part 22 can be inserted into the needle tube 1 from an opening of the mounting chamber 11 at the tail end 16 of the needle tube 1. A connection part between the holding part 21 and the inserting part 22 is configured to be a step structure, and the holding part 21 has an abutting surface 23 connected to the inserting part 22.

When the inserting part 22 is totally inserted into the mounting chamber 11, the abutting surface 23 is abutted against the tail end 16 of the needle tube 1. The abutting surface 23 has an external diameter same as that of the tail end 16 of the needle tube 1, so that the outer wall of the handle 2 can align with the outer wall of a connection part of the needle tube 1.

Referring to FIGS. 3-4, the antenna 3 is made of metal material, and is used to transmit signal and has conductive function. The antenna 3 is formed with a first external thread 31 at a middle part thereof, and internal threads of the two limiting nuts 53 are cooperated with the first external thread 31. The locking member 51 is limited between the two limiting nuts 53, so that when the antenna 3 is mounted into the mounting chamber 11, the locking member 51 can slide into the mounting chamber 11 with movement of the antenna 3. It is worth noting that, the limiting nuts 53 does not clamp the locking member 51, which only plays a limiting role to the locking member 51 along the length direction of the antenna 3, and the locking member 51 can produce elastic deformation, so that it has a relative motion with the limiting nuts 53 in a radial direction of the antenna 3. A first locating ring 34 is formed on the antenna 3 at one side of the first external thread 31 close to the head end 15 of the needle tube 1, and the first locating ring 34 is circumferentially protruded from the antenna 3, and has an external diameter greater than the internal diameter of the limiting nut 53. The limiting nut 53 close to the head end 15 of the needle tube 1 is abutted against the first locating ring 34 to locate the limiting nut 53 and the locking member 51.

Referring to FIGS. 3-4, the locking slot 12 is formed in the inner wall of the needle tube 1 around an axis of the needle tube 1, and the locking slot is configured to be a ring structure. The locking member 51 is configured to be a C-shaped structure, which does not contact with the antenna 3 and circles around the first external thread 31 of the antenna 3 and is an elastic snap ring made of copper. When the locking member 51 is sliding in the mounting chamber 11 along the length direction of the needle tube 1, the locking member 51 is configured to be compressed by the inner wall of the needle tube 1 and deformed elastically. Specifically, the locking member 51 has a first sliding portion 511 close to the head end 15 of the needle tube 1, a second sliding portion 512 close to the tail end 16 of the needle tube 1 and a guiding portion 513 for connecting the first sliding portion 511 to the second sliding portion 512, and the guiding portion 513 is gradually narrow along a direction from the second sliding portion 512 to the first sliding portion 511. Specifically, the guiding portion 513 has a cross-sectional area gradually decreased from one end thereof close to the second sliding portion to one end thereof close to the first sliding portion. In some embodiments of the present application, the locking member 51 has a normal state not pressed by an external force and a compressed state pressed into the mounting chamber 11 by an external force. In the normal state, the first sliding portion 511 has an external diameter less than the internal diameter of the mounting chamber 11, and the second sliding portion 512 has an external diameter greater than the internal diameter of the mounting chamber 11, so that when the antenna 3 is inserted from the opening of the mounting chamber 11 to the head end 15 of the needle tube 1, the first sliding portion 511 is able to be inserted into the mounting chamber 11 and the guiding portion 513 can play a role of guiding, so that the locking member 51 can be compressed gradually and slide into the mounting chamber 11. After the second sliding portion 512 of the locking member 51 slide into the locking slot 12, the locking member 51 is expanded and snapped into the locking slot 12 to achieve the limitation to the antenna 3. It is worth noting that, in some embodiments of the present application, when the locking member 51 is snapped into the locking slot 12, the internal diameters of the first sliding portion 511 and the second sliding portion 512 are both greater than the external diameter of the first external thread 31, so that the locking member 51 can be abutted against the inner wall of the needle tube 1 and not contract with the antenna 3 after being expanded.

Referring to FIGS. 3-4, the locking nut 52 is inserted from the holding part 21 of the handle 2 into the wire-passing channel 24, and is formed with an internal thread. Specifically, the locking nut 52 is abutted against an end surface of the holding part 21 away from the needle tube 1. A second external thread 32 is formed on the antenna 3 at one end thereof for cooperating with the locking nut 52, and the antenna 3 is configured to run through the wire-passing channel 24 of the handle 2 and is in thread connection with the locking nut 52. Therefore, when the locking member 51 is snapped into the locking slot 12, one end of the handle 2 is abutted against the needle tube 1 by the abutting surface 23, and the other end of the handle 2 is abutted against the locking nut 52, at this time, the antenna 3 between the locking member 51 and the locking nut 52 is tensioned, thereby providing a tensile force to the locking nut 52 towards the tail end 16 of the needle tube 1, so that the handle 2 can be locked and limited between the locking nut 52 and the needle tube 1.

Referring to FIGS. 3-4, the outer wall of the limiting nut 53 abuts against the inner wall of the mounting chamber 11, so that an injection chamber 14 is formed between the limiting nut 53 close to the tail end 16 of the needle tube 1 and the tail end 16 of the needle tube 1. Specifically, the opening of the mounting chamber 11 can be closed by the abutting surface 23 of the handle 2 after the inserting part 22 of the handle 2 is inserted. An injection chamber 14 is formed between the limiting nut 53 close to the tail end 16 of the needle tube 1, the inner wall of the mounting chamber 11 and the abutting surface 23 of the handle 2, and the inserting part 22 is inserted into the injection chamber 14. In some embodiments of the present application, before the handle 2 is inserted, the glue will be injected from the opening of the mounting chamber 11 to the direction of the limiting nut 53. After the inserting part 22 of the handle 2 is inserted, the glue will backflow to the direction of the tail end 16 of the needle tube 1 and fill a gap between the inserting part 22 and the inner wall of the needle tube 1, so that the handle 2 can be further connected to the needle tube 1 through glue, and a better sealing performance is achieved.

Referring to FIGS. 3-4, the temperature measuring probe also includes an elastic tab 6 and a PCB control board 7, in which the PCB control board 7 is connected to one end of the antenna 3 close to the head end 15 of the needle tube 1. There are two elastic tabs 6 symmetrically arranged on two board surfaces of the PCB control board 7, and the elastic tabs 6 are compressed and abutted against the PCB control board 7 and the inner wall of the needle tube 1, so as to support the PCB control board 7. In some embodiments of the present application, after the PCB control board 7 and the antenna 3 are connected with each other through point welding after inserting, which will not be repeated here. The PCB control board 7 is configured for electrically connecting the antenna 3 to the first thermal sensor 4. In some embodiments of the present application, the first thermal sensor 4 is positioned in the spike part 13 of the needle tube 1, and a temperature measuring head of the first thermal sensor 4 contacts with the inner wall of the spike part 13 to measure the temperature. Temperature measuring signals can be received by the PCB control board 7 and transformed to temperature signals that is transmitted to a mobile smart terminals through the antenna 3. Specifically, the handle 2 is made of ceramic material; the PCB control board 7 has a Bluetooth module thereon; and the antenna 3 is coupled with the Bluetooth module, so that the antenna 3 is able to transmit the temperature signals to outside.

Referring to FIGS. 3-4, the PCB control board 7 is also electrically connected with a power supply module 8 that is rechargeable and dischargeable, which is connected to the PCB control board 7 and the first thermal sensor 4 to supply power to them. A positive electrode of the power supply module 8 is electrically connected to the antenna 3; the PCB control board 7 is electrically connected to the elastic tab 6; so that a negative electrode of the power supply module 8 is electrically connected to the needle tube 1 through the elastic tab 6. The needle tube 1, the locking nut 52 and the elastic tab 6 are all made of conductive metal materials. In actual working conditions of the embodiments of the present application, the temperature measuring probe is able to cooperate with an external charging box, so that the locking nut 52 is electrically connect to the positive electrode of an external power supply, and the needle tube 1 is electrically connect to the negative electrode of the external power supply, and further the positive electrode of the power supply module 8 is electrically connect to that of the charging box, and the negative electrode of the power supply module 8 is electrically connect to that of the charging box to supply power to the power supply module 8.

Referring to FIGS. 3-4, in order to prevent the antenna 3 from contacting the inner wall of needle tube 1, a third external thread 33 is formed on the needle tube 1 at one end close to the PCB control board 7, and is in thread connection with a supporting nut 36. A peripheral of the supporting nut 36 abuts against the inner wall of the needle tube 1 to support the antenna 3 and prevent a short circuit during charging due to contact between the antenna 3 and the needle tube 1. A second locating ring 35 is formed on the third external thread 33 of the antenna 3 at one side thereof close to the tail end 16 of the needle tube 1, and is circumferentially protruded from the antenna 3. The second locating ring 35 has an external diameter greater than the internal diameter of the supporting nut 36, and the supporting nut 36 is abutted against the second locating ring 35 to locate the supporting nut 36. It is worth noting that, the supporting nut 36 and the supporting nut are both made of non-conductive ceramics.

Referring to FIGS. 3-4, in order to connecting the second thermal sensor 9 to the PCB control board 7, the accommodating space includes an accommodating slot 37 for accommodating the second thermal sensor 9 and a through slot 371 configured for allowing the pin 91 to pass through. The accommodating slot 37 is positioned at a circumferential sidewall of the antenna 3 away from the head end 15 of the needle tube 1, moreover, a through slot 371 is formed on the first external thread 31; a feed-passing slot 374 is formed on the third external thread 33; and the accommodating slot 37, the through slot 371, the feed-passing slot 374 are aligned in a length direction of the antenna 3. There are two pins 91 of the second thermal sensor 9; the second thermal sensor 9 is mounted in the accommodating slot 37; and the two pins 91 are provided on the surface of the antenna 3 in parallel and pass through the through slot 371 and the feed-passing slot 374 in turn, and then connected to the PCB control board 7. It is worth noting that, an angle occupied by the through slot 371 in the circumferential direction of the antenna 3 is less than 90 degrees, so that the first external thread 31 and the third external thread 33 that both formed with the through slot 371 still have good thread cooperating effect. Specifically, in some embodiments of the present application, the angle occupied by the opening of the through slot 371 in the circumferential direction of the antenna 3 is 30 degrees.

Referring to FIGS. 1-2, an implementation principle of the high stability Bluetooth temperature measuring probe of the present application is that: the locking member 51 is indirectly connected to the antenna 3 by clamping the locking member 51 with the limiting nut 53, and the locking nut 52 is inserted into the handle 2 and in thread connection with the antenna 3. When the guiding portion 513 of the locking member 51 is snapped into the locking slot 12 in the needle tube 1, the locking nut 52 is able to be tighten to the second external thread 32 of the antenna 3, so that the antenna 3 between the locking member 51 and the locking nut 52 can be tighten, and the handle 2 abuts against the tail end 16 of the needle tube 1 by the locking nut 52, and further high stability mounting between the needle tube 1 and the handle 2 can be achieved.

Moreover, the second thermal sensor 9 is provided on the antenna 3 away from the head end 15 of the needle tube 1, so that the pin 91 is positioned on the surface of the antenna 3 and extends to the PCB control board 7 through the through slot 371, and the PCB control board 7 can be electrically connected to the second thermal sensor 9.

Embodiment 2

Figure 5:
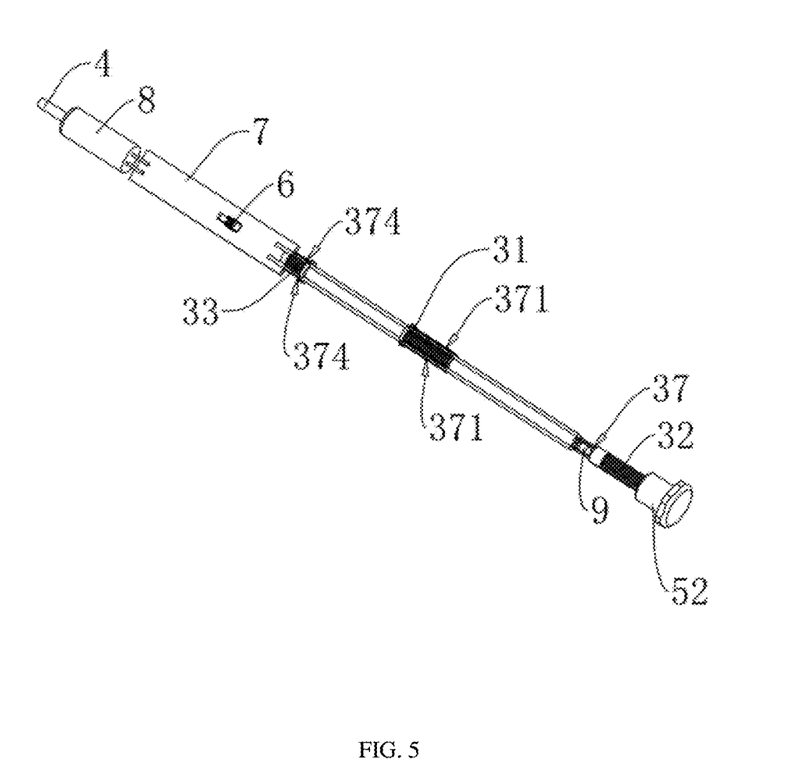
FIG. 5 is a structure schematic diagram for illustrating the accommodating space of the antenna according to embodiment 2 of the present application.

Referring to FIG.5, the difference of embodiment 2 from embodiment 1 lies in that the number of the through slot 371 is two, the through slot 371 is configured to run through the first external thread 31 along its circumferential direction, and the two through slots 371 are arranged at intervals. The number of the feed-passing slot 374 is two; each feed-passing slot 374 is aligned with the through slot 371 in the length direction of the antenna 3; the two pins 91 are positioned on the surface of the antenna 3 along the length direction of the antenna 3; and the pins 91 is configured to run through the through slot 371 and the feed-passing slot 374 from the second thermal sensor 9 to the PCB control board 7 correspondingly.

Referring to FIG. 5, an implementation principle of the high stability Bluetooth temperature measuring probe in embodiment 2 of the present application is that: two through slots 371 are formed on the first external thread 31 at intervals, and two feed-passing slots 374 are formed on the third external thread 33 correspondingly, so that the two pins 91 are positioned on the surface of the antenna 3 along the length direction of the antenna 3, and the two pins are configured to run through the through slots 371, respectively.

Embodiment 3

Figure 6:
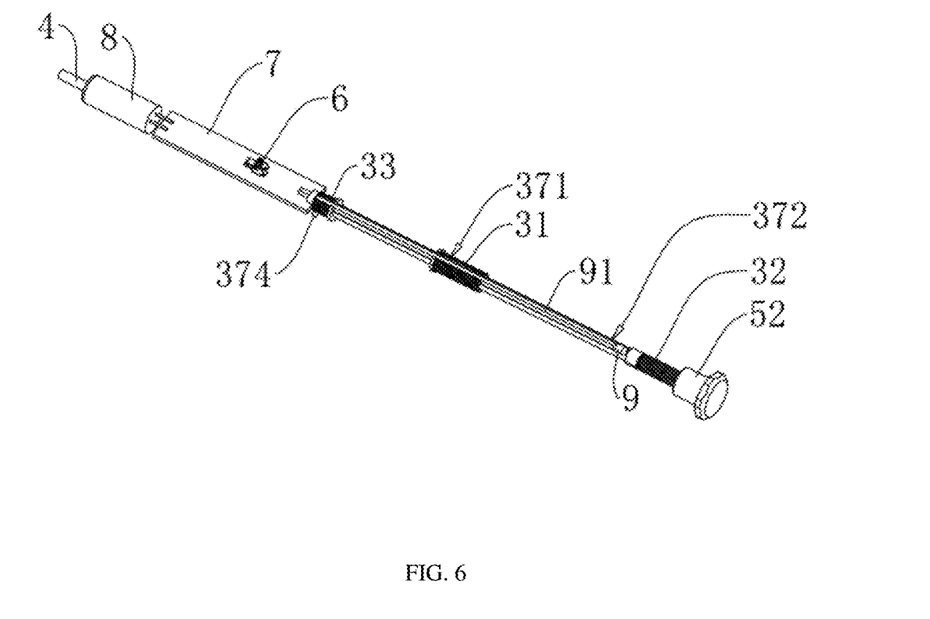
FIG. 6 is a structure schematic diagram for illustrating the accommodating space of the antenna according to embodiment 3 of the present application.

Referring to FIG.6, the difference of embodiment 3 from embodiment 1 lied in that the accommodating space is a mounting slot 372 configured for accommodating the second thermal sensor 9 and the pin 91. The mounting slot 372 is recessed in the circumferential sidewall of the antenna 3, and the mounting slot 372 has a length same as that of the antenna 3. Specifically, the mounting slot 372 extends from one end of the antenna 3 close to the PCB control board 7 to one end away from the head end 15 of the needle tube 1. The second thermal sensor 9 is mounted at one end of the mounting slot 372 away from the head end 15 of the needle tube 1. The mounting slot 372 is configured to run through the first external thread 31 and the third external thread 33, so that the mounting slot 372 is communicated with the through slots 371 and the feed-passing slot 374.

An implementation principle of the high stability Bluetooth temperature measuring probe in embodiment 3 of the present application is that: the mounting slot 372 is recessed on the surface of the antenna 3 along the length direction thereof, and the second thermal sensor 9 and pins 91 are mounted on the mounting slot 372 at the same time.

Embodiment 4

Figure 7:
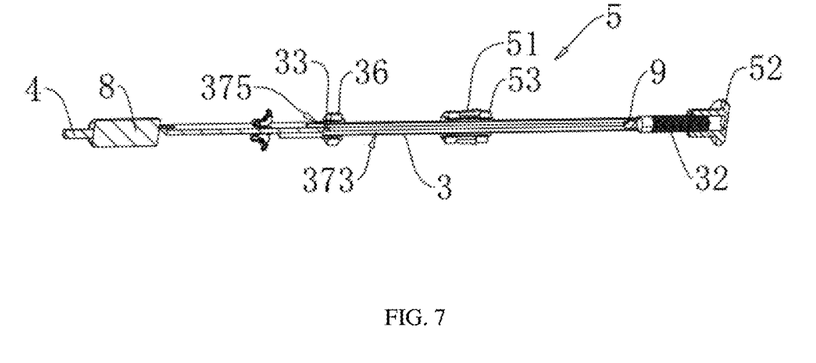
FIG. 7 is a section view for illustrating the accommodating space of the antenna according to embodiment 4 of the present application.

Referring to FIG.7, the difference of embodiment 4 from embodiment 1 lied in that, the antenna 3 is a hollow columnar structure, the antenna 3 has a hollow cavity 373. The accommodating space is the hollow cavity 373 in the inner of the antenna 3 in embodiment 4 of the present application, and the hollow cavity 373 is formed in the antenna 3 along the length direction thereof. The second thermal sensor 9 is positioned in the hollow cavity 373 and away from the head end 15 of the needle tube 1. One end of the pin 91 is connected to the second thermal sensor 9, and the other end extends to one end of the antenna 3 close to the PCB control board 7. A wire-passing port 375 is formed on an end surface of the antenna 3 close to the PCB control board 7, and the pin 91 extends out of the antenna 3 via the wire-passing port 375 and is electrically connected to the PCB control board 7.

An implementation principle of the high stability Bluetooth temperature measuring probe in embodiment 4 of the present application is that: the antenna 3 is a hollow structure, so that the inner of the antenna 3 is taken as an accommodating space, the second thermal sensor 9 and the pins 91 are mounted inside the antenna 3 to play a role of allowing the mounting of the locking assembly 5.

The above are the preferred embodiments of the present application, which are not intended to limit the protection scope of the present application. Therefore, all equivalent changes made according to the structure, shape and principle of the present application should fall within the protection scope of the present application.

What is claimed is:

1. A Bluetooth temperature measuring probe, comprising:
    a needle tube having a hollow mounting chamber, wherein the needle tube has a head end and a tail end along a length direction of the needle tube;
    a handle configured to abut against the tail end of the needle tube;
    a first thermal sensor configured for measuring temperature, wherein the first thermal sensor is positioned in the hollow mounting chamber of the needle tube close to the head end;
    an antenna configured for transmitting signals, wherein the antenna is mounted inside the needle tube and electrically connected to the first thermal sensor; and
    a locking assembly configured for connecting the handle to the needle tube and locking the handle and the needle tube with each other,
    wherein the locking assembly comprises a locking member, a locking nut and two limiting nuts; the two limiting nuts are connected to the antenna; the locking member is disposed between the two limiting nuts; an inner wall of the needle tube is defined with a locking slot configured for snap-in of the locking member; the locking nut is connected to the antenna; and the locking nut cooperates with the two limiting nuts, such that the handle abuts against the tail end of the needle tube.

2. The Bluetooth temperature measuring probe according to claim 1, comprising a printed circuit board (PCB) control board positioned in the hollow mounting chamber and a second thermal sensor configured for measuring an environment temperature, wherein the head end of the needle tube is configured to be placed inside an object to be measured and conduct heat; the first thermal sensor is configured to measure a temperature of the head end of the needle tube; and the first thermal sensor and the second thermal sensor are both electrically connected to the PCB control board; a pin is connected between the second thermal sensor and the PCB control board; the antenna has an accommodating space for accommodating the second thermal sensor and the pin; and the accommodating space is configured for allowing the locking assembly to pass through.

3. The Bluetooth temperature measuring probe according to claim 2, wherein the accommodating space comprises an accommodating slot for accommodating the second thermal sensor and a through slot configured for allowing the pin to pass through; the antenna has a first external thread at a middle part thereof; the through slot is configured to run through the first external thread; the accommodating slot is recessed in the antenna; and the pin is configured to pass through the through slot.

4. The Bluetooth temperature measuring probe according to claim 2, wherein there are two of the pins; the accommodating space comprises an accommodating slot for accommodating the second thermal sensor and two through slots configured for allowing the two pins to pass through; the antenna has a first external thread at a middle part thereof; the two through slots are formed on a surface of the first external thread at intervals; and the two pins are configured to run through the two through slots, respectively.

5. The Bluetooth temperature measuring probe according to claim 2, wherein the accommodating space comprises a mounting slot recessed in a circumferential sidewall of the antenna; the mounting slot is configured for accommodating the second thermal sensor and the pin; the mounting slot is configured to run from one end of the antenna close to the PCB control board to one end of the antenna away from the PCB control board; the antenna is formed with a first external thread at a middle part thereof; and the mounting slot is configured to run through the first external thread.

6. The Bluetooth temperature measuring probe according to claim 2, wherein the antenna is configured to be a hollow columnar structure; and the accommodating space is formed inside the antenna along a length direction of the antenna.

7. The Bluetooth temperature measuring probe according to claim 1, wherein the locking slot is formed around an axis of the needle tube; and the locking member is configured to be a C-shaped structure and configured to be compressed by the inner wall of the needle tube and deformed elastically when the locking member is sliding in the hollow mounting chamber along the length direction of the needle tube.

8. The Bluetooth temperature measuring probe according to claim 1, wherein the locking member has a first sliding portion close to the head end of the needle tube, a second sliding portion close to the tail end of the needle tube and a guiding portion for connecting the first sliding portion to the second sliding portion; the guiding portion has a cross-sectional area gradually decreased from one end of the guiding portion close to the second sliding portion to one end of the guiding portion close to the first sliding portion; the first sliding portion has an external diameter less than an internal diameter of the hollow mounting chamber; and the second sliding portion has an external diameter greater than an external diameter of the hollow mounting chamber.

9. The Bluetooth temperature measuring probe according to claim 1, wherein the handle comprises a holding part and an inserting part configured to be inserted into the hollow mounting chamber; and the holding part has an abutting surface connected to the inserting part and configured to abut against the tail end of the needle tube when the inserting part is inserted into the hollow mounting chamber.

10. The Bluetooth temperature measuring probe according to claim 1, wherein an outer wall of each of the two limiting nuts abuts against an inner wall of the hollow mounting chamber; an injection chamber is formed between one of the two limiting nuts close to the tail end and the tail end; and an inserting part of the handle is configured to be inserted into the injection chamber.

11. The Bluetooth temperature measuring probe according to claim 1, comprising two elastic tabs and a printed circuit board (PCB) control board, wherein the PCB control board is configured for electrically connecting the antenna to the first thermal sensor; the two elastic tabs provided at an upper side and a lower side of the PCB control board, respectively; and the two elastic tabs are configured to abut against the inner wall of the needle tube when being compressed.

12. The Bluetooth temperature measuring probe according to claim 11, wherein the PCB control board is electrically connected with a power supply module; a positive electrode of the power supply module is electrically connected to the antenna; the PCB control board is electrically connected to the two elastic tabs; a negative electrode of the power supply module is electrically connected to the needle tube through the PCB control board and the two elastic tabs in turn; the locking nut is configured to electrically connect the positive electrode of the power supply module to an external power supply; and the needle tube is configured to electrically connect the negative electrode of the power supply module to the external power supply.

13. The Bluetooth temperature measuring probe according to claim 11, wherein a supporting nut is in thread connection with one end of the antenna close to the PCB control board; a periphery of the supporting nut abuts against the inner wall of the needle tube; and each of the two limiting nuts and the supporting nut are made of a ceramic material.

* * * * *